July 19, 1938.　　W. C. ANDERSON ET AL　　2,124,269
BUS BAR CONDUIT DISTRIBUTION SYSTEM
Filed June 5, 1937　　2 Sheets-Sheet 1
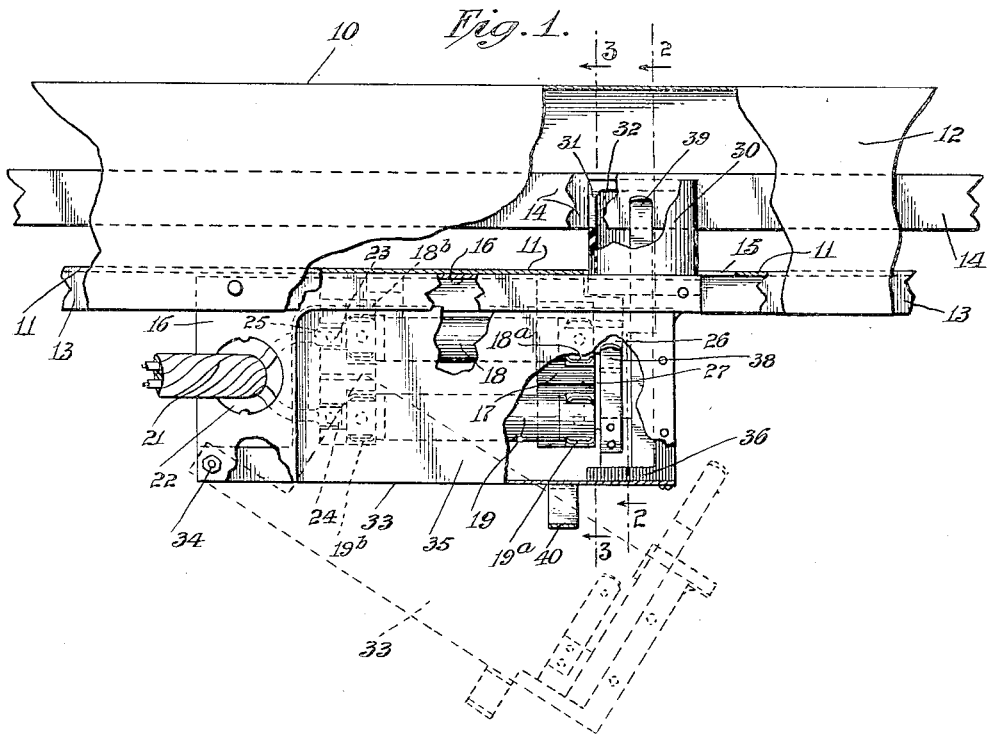
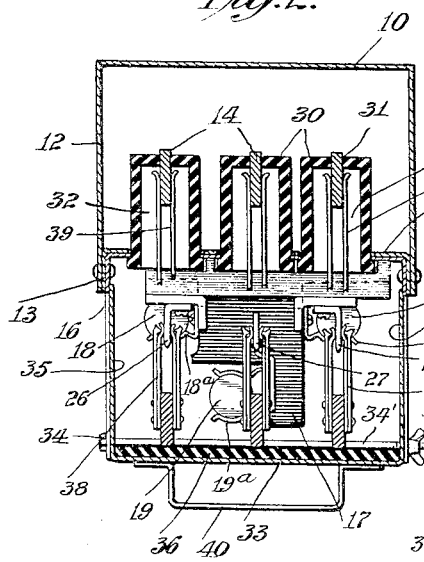
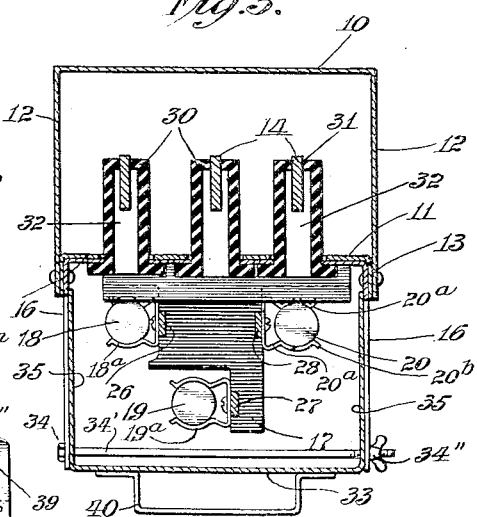
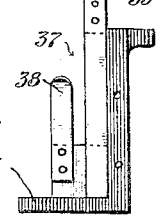
William C. Anderson
Elmer T. Carlson
INVENTORS
BY
ATTORNEY

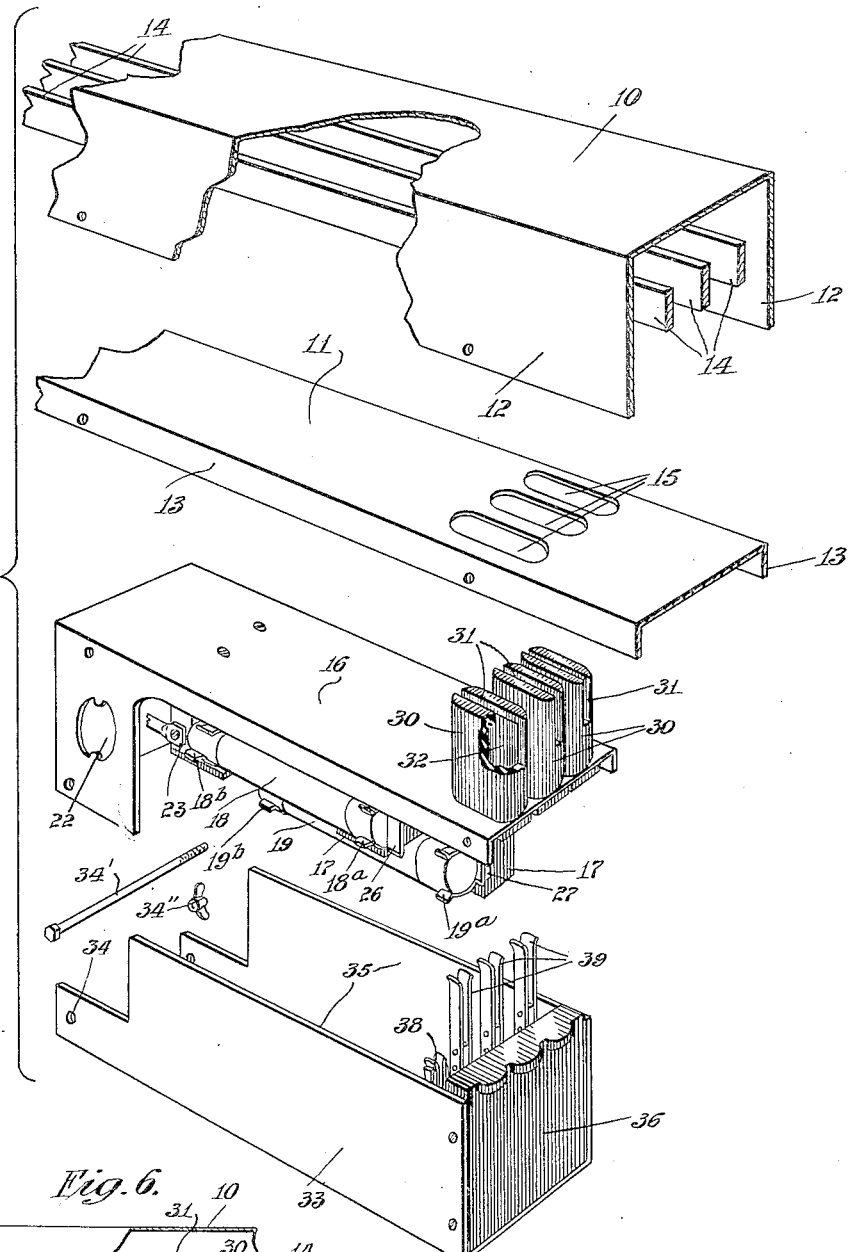
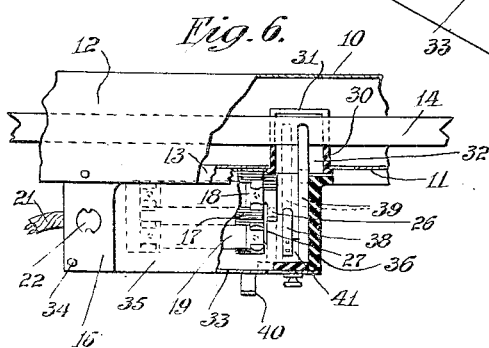

Patented July 19, 1938

2,124,269

UNITED STATES PATENT OFFICE 2,124,269

BUS BAR CONDUIT DISTRIBUTION SYSTEM

William C. Anderson, Bromley, and Elmer T. Carlson, South Fort Mitchell, Ky., assignors to The Trumbull Electric Manufacturing Company, Plainville, Conn., a corporation of Connecticut Application June 5, 1937, Serial No. 146,608

11 Claims. (Cl. 247—3)

Our invention relates to bus bar conduit connecting devices and particularly to facilities for opening and closing the circuit from the bus bars to a branch circuit, for instance to a power consuming device.

One object is to provide a structure of this character which is simple, safe and convenient to operate.

Another object is to provide convenient and reliable means for mounting the circuit protecting fuses.

Another object is to provide a form of device which can be made and tested as to the operation of the switch, fuse and cable connections before applying it to the conduit.

Another object is to provide a device which can be readily installed on a bus bar conduit.

Another object is to provide means for breaking the circuit in two places in such a manner as to cause the least possible damage or likelihood of damage to the bus bars preferably by breaking the connection to the branch circuit just before breaking connection with the bus bars.

Another object is to minimize the danger of arcing from the bus bars.

Another object is to facilitate wiring.

The specific advantages will be pointed out as the specification proceeds.

In its preferred form the invention contemplates a box consisting of two parts which may conveniently be called a body part and a cover part. The body part which is adapted to be secured to one face of the conduit contains an insulating base or bases which carry the fuse clips and attached fuses, and has arc confining devices adapted to project into the conduit into proximity to the bus bars. This body part also has means for attachment of one or more branch circuit cables to the body and connecting the wires to the branch circuit ends of the fuses. The fuses are mounted in clips which project laterally when the device is installed in the usual manner so that it is impossible for the fuses to fall out.

The cover part is hinged to the body part independently of the cable connections and carries pairs of switch blades, jaws or stabs as they are sometimes called, some of which are adapted to engage the main line terminals of the fuses and others which pass into the arc confining devices within the conduit and directly engage the bus bars themselves.

Fig. 1 is a side view of a fragment of a bus bar conduit with one of our improved devices attached.

Fig. 2 is a transverse sectional view on the plane of the line 2—2 of Fig. 1.

Fig. 3 is a transverse sectional view on the plane of the line 3—3 of Fig. 1.

Fig. 4 is a detail side view of one of the duplex switch members.

Fig. 5 is an exploded perspective view of a fragment of a conduit and parts of the branch circuit connecting device.

Fig. 6 is a fragmentary side view and partial section showing a modified form of switching device.

In a desirable type of conduit for this system the conduit consists of two channel-shaped parts 10 and 11 having their flanges 12 and 13 overlapping. The main part 10 forms a housing for the bus bars 14 and the part 11 constitutes a closure having openings 15 for the passage of the switch blades and protective insulation or confining devices.

The connecting device has a box-like body 16 which is secured between the flanges 13 of the conduit. This body is preferably of sheet metal and has one or more insulating parts 17 which support the fuses 18, 19 and 20 or other protective devices and the switch contacts connected thereto. The fuse clips 18$^a$, 19$^a$ and 20$^a$ and 18$^b$, 19$^b$ and 20$^b$ are mounted on the sides of the insulating parts so that the fuses are not likely to drop out. When two fuses are employed such as 18 and 20 the clips should preferably be arranged to support the fuses on opposite sides of the insulation wall. When three fuses are employed two may be mounted on one side such as 18 and 19 but on different planes and the other on the opposite side.

The branch circuit cable 21 is connected to one side or to the end of the box body at the position of one of the knock-outs 22. The individual wires are connected to the branch terminals 23, 24 and 25 of the respective fuses. Switch contacts 26, 27 and 28 are mounted on the insulating wall and connected to the opposite ends of the fuses.

The arc confining devices 30 are carried by the box body 16 and project through the openings 15 into the conduit. A slot 31 in the device 30 accommodates a bus bar. Each device 30 has a chamber 32 to receive a switch blade or the like.

The cover member 33 of the connecting device is hinged at 34 to the sides of one end of the body 16 and has side wings or flanges 35 which extend around the sides to enclose the fuses when the cover is closed. This cover has a suitable handle 40 to facilitate operation. Inside of the cover is an insulating means or base 36 which carries the movable switch members such as 37. Each of these switch members has two blades, jaws or stabs 38 and 39, one of which is designed to engage one of the switch contacts 26, 27 or 28 and the other of which engages the corresponding bus bar 14 when the cover is closed. The hinge 34 may consist of the removable bolt 34' and the wing-nut 34" to facilitate attachment and detachment of the movable switch parts.

To electrically disconnect the branch circuit it is merely necessary to pull down on the cover so as to separate the switch members from the bus bars and from the stationary switch contacts thus breaking the circuit in two places.

These switch members may be so proportioned that both blades will break circuit at once or the branch circuit may be disconnected slightly before the switch blades leave the bus bars and in this way ensuring a safer break. The arc confining devices within the conduit act, as their name implies, to confine the arc at the bus bars so as to minimize the possibility of damage to the bus bars, replacement of which is expensive and troublesome as it ties up the entire system.

When the cover is open it will be seen that the fuses are fully exposed at the sides so that it is very easy to get at the fuses to inspect them or to replace them. This is of great importance as the conduits are usually placed high up in the air and frequently in positions which are with difficulty accessible.

This construction also lends itself readily to a modification in which the switch members 41 as shown in Fig. 6 are slidable so that when the cover is open the switch members may be slid in the cover so that when the cover is closed only one set of blades will contact with the stationary contacts or bus bars thus leaving the box closed but with the circuit open.

As the cover with the attached switch member is detachable from the body of the box containing the fuses it may be removed without disturbing the cable connection. Also the insulating parts which carry the fuse clips and switch contacts may be removed from the box without disturbing the connection of the cable with the side or end wall of the box.

It will be seen that this construction makes it possible to install the device very easily. The cover of the device with the movable switch members may be removed. The electrician can then connect the branch circuit conductors to the proper terminals in the box body. This is especially important when the box has already been attached to the conduit. Of course it is also possible to attach the branch circuit cable to the box before attaching the box to the conduit. The cover of the box with the attached switch members may be readily hinged to the body of the box after the wiring has been completed and either before or after inserting the fuses.

We claim:

1. In a bus bar conduit distribution system, a fuse box and terminal connector secured to the conduit and having means for supporting fuses in laterally exposed positions so as to permit fuses to be readily inserted and removed, a branch circuit connection to one end of each fuse at one end of the connector, a switch contact for the opposite end of each fuse and a hinged cover for the fuse box having side wings for overlapping the fuses when the cover is closed and exposing the fuses at the sides of the supporting means when the cover is open and a switch member carried by said cover for each bus bar, each switch member having a blade for engaging a switch contact and a blade connected thereto for passing into the conduit and directly engaging a companion bus bar when the cover is closed.

2. In a bus bar conduit distribution system, a fuse box and terminal connector having means for supporting fuses in laterally exposed positions with an insulating wall between them, a branch circuit connection with one end of each fuse, a switch contact for the opposite end of each fuse and a cover for the fuse box having side wings for overlapping the sides of the fuses when the cover is closed and exposing the fuses so as to permit convenient removal and insertion of the fuses when the cover is open and a switch member for each bus bar carried by said cover, each switch member having a blade for engaging one of said switch contacts and a second blade connected thereto for passing into the conduit and directly engaging a companion bus bar when the cover is closed.

3. A branch connector for a conduit system having a base adapted to be secured to one face of the conduit, insulating means mounted on said base, a pair of fuses carried by said insulating means on opposite sides thereof and removable by movement in planes parallel with the plane of the face of the conduit to which the base is applied, a branch conductor connected to one end of each fuse, a switch contact connected to the opposite end of each fuse, a cover hinged to one end of the base and having flanges covering the fuses at opposite sides of the base when the cover is closed, switch members carried by the cover, each switch member having a blade for engaging one of the switch contacts and a second blade for directly engaging a corresponding bus bar.

4. A branch box connector for a bus bar conduit system comprising a base member for attachment to one face of the conduit, said base member including an insulating support having an arc confining device for extending into the conduit and embracing a bus bar, said support carrying fuse clips with switch terminals at the ends of fuse clips, branch conductors connected to opposite fuse clips, and a switch member movably carried by the base and having two switch blades for each branch circuit, one blade adapted to engage one of the fuse terminals and the other blade adapted to directly engage a bus bar within an arc confining device when the first mentioned blade engages its fuse terminal.

5. In a bus bar conduit distribution system, a fuse box and terminal connector secured to the conduit and having means for supporting fuses, a cable secured to one end of said box and having branch circuit connections to said fuses, switch contacts for the opposite ends of said fuses and a hinged cover for the fuse box enclosing the fuses when the cover is closed and exposing the fuses when the cover is open and a switch member carried by said cover for each bus bar, each switch member having a blade for engaging a switch contact and a blade connected thereto for entering the conduit and directly engaging a companion bus bar when the cover is closed, each circuit being broken at two places when the cover is opened.

6. In a bus bar conduit distribution system, a fuse box and terminal connector having means for supporting fuses in laterally exposed positions, a cable connected to said fuse box, a branch circuit connection with one end of each fuse, a switch contact for the opposite end of each fuse and a cover for the fuse box hinged to the box independently of the cable connection and having side wings for overlapping the sides of the fuses when the cover is closed and exposing the fuses so as to permit ready removal of the fuses when the cover is open and a switch member for each bus bar carried by said cover, each switch member having a blade for engaging one of said switch contacts and a second blade connected thereto for directly engaging a companion bus bar when the cover is closed.

7. A branch box connector for a bus bar conduit system comprising a base member for attachment to one face of the conduit, and having a branch cable connection, said base member having an arc confining device for extending into the conduit and embracing a bus bar, fuse clips carried by said base with switch contacts at the ends of the fuse clips, branch conductors connected to fuse clips, and a switch member hinged to the base and having two switch blades for each branch circuit, one blade adapted to engage one of the switch contacts and the other blade adapted to enter the arc confining device and directly engage a bus bar within an arc confining device in the conduit when the first mentioned blade engages its switch contact.

8. A branch connector for a conduit system having a base adapted to be secured to one face of the conduit, a branch cable connected to one end of the base, insulating means mounted on said base, fuses carried by said insulating means on opposite sides thereof and removable by movements in planes parallel with the plane of the face of the conduit to which the base is applied, a branch conductor connected to one end of each fuse, a switch contact connected to the opposite end of each fuse, a cover hinged to one end of the base independently of the cable and having flanges covering the fuses at opposite sides of the base when the cover is closed, switch members carried by the cover, each switch member having a blade for engaging one of the switch contacts and a second blade for entering the conduit and directly engaging a corresponding bus bar.

9. A conduit fuse box having a stationary portion adapted to be secured to the face of a conduit and having its sides cut away except at one end, a cable connection at said latter end, an insulating base mounted in the stationary portion and having fuse clips on opposite sides with an insulating wall between them, a cover hinged to the stationary portion near the cable connection and having side wings for covering the fuse clips, two switch blades carried by said hinged cover and electrically connected together, a stationary contact carried by said insulating base and adapted to be engaged by one of the switch blades when the cover is closed, the other switch blade extending beyond the sides of the cover and adapted to enter into the conduit to which the fuse box is connected and engage directly a bus bar housed therein.

10. A branch connector switch and fuse box for attachment to a bus bar conduit having a hole in one wall leading to a bus bar within the conduit, said box having a top plate to be attached to the conduit and downwardly extending walls at one end, one of which has means for the entrance of a branch circuit conductor, an arc confining member carried by the other end of the top plate, said member having a recess in its lower end and a slot in its upper end intersecting said recess and adapted to be inserted through the hole in a wall of the conduit so that the slotted end of said arc confining member embraces a bus bar in the conduit, a pair of fuse clips supported by said top plate but insulated therefrom, one of said fuse clips having a terminal for connection of the branch circuit conductor, a stationary switch contact connected to the other fuse clip, a cover hinged to the lower edge of one of the downwardly extending end walls of the top plate and having side walls for covering the sides of the fuse clips and an end wall connecting the side walls, a switch member carried by and movable with the cover but insulated therefrom, said switch member having two connected blades one of which engages the stationary switch contact when the cover is closed and the other of which projects beyond the end wall of the cover and is adapted to extend into the arc confining member and engage the bus bar in the conduit when the cover is closed, the parts being so constructed and arranged that when the cover is opened the branch circuit is opened at the bus bar in the recess of the arc confining member and at the stationary switch contact.

11. A fuse box connection for attachment to a bus bar conduit including a top plate having means for attachment to the conduit and having side walls at one end provided with cable connecting means for a branch circuit, insulating means carried by the lower side of the top plate having oppositely disposed vertical supporting walls and an intermediate supporting wall below the oppositely disposed walls, pairs of fuse clips supported by said oppositely disposed walls and by said intermediate wall, the clips all having their entrances facing laterally and each having at least one supporting jaw extending horizontally so that the fuse supported thereby will not fall out even if the jaws get loose, the sides of the box being open along the center and the fuses all being removable laterally in a direction parallel with the plane of the top plate, one of the clips of each pair having a branch circuit terminal, a cover hinged to the side walls of the box and having side flanges covering the fuses when the cover is closed and switch members carried by the cover for connection to one of the clips of a pair of fuse clips, each switch member having a bus-bar-engaging member which directly engages a bus bar when the cover is opened.

WILLIAM C. ANDERSON.
ELMER T. CARLSON.